April 10, 1951    B. C. MAIER    2,548,226
PLANTING SIGHT
Filed Jan. 4, 1951
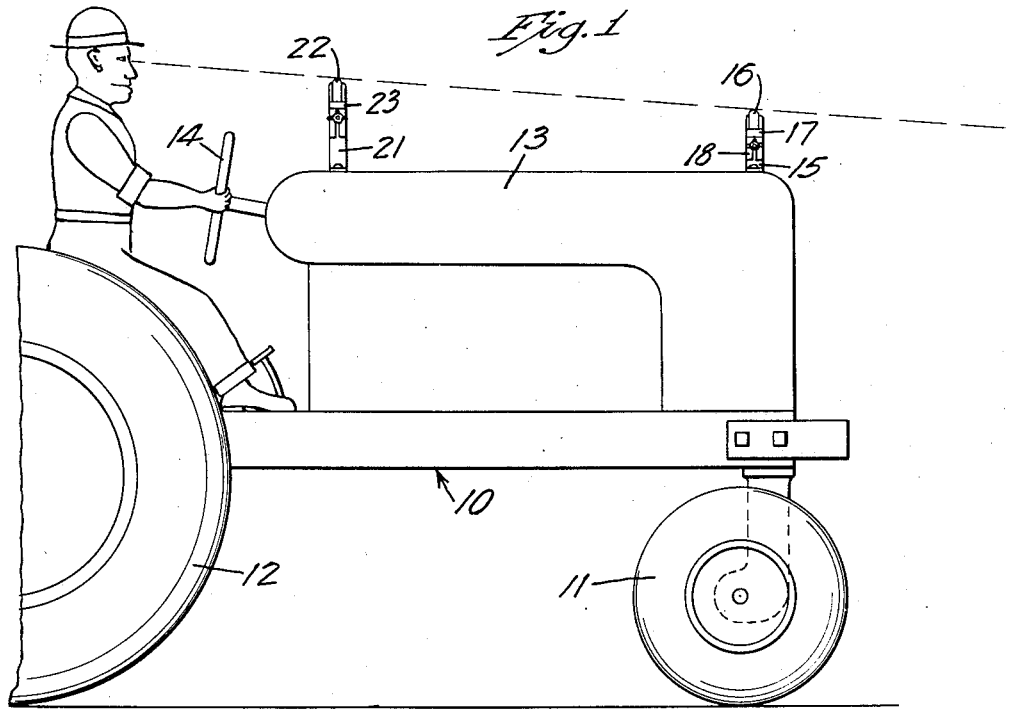
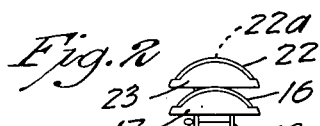
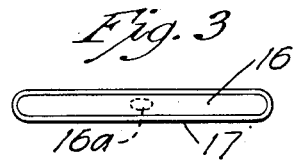
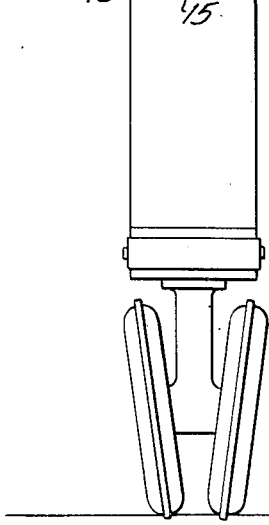
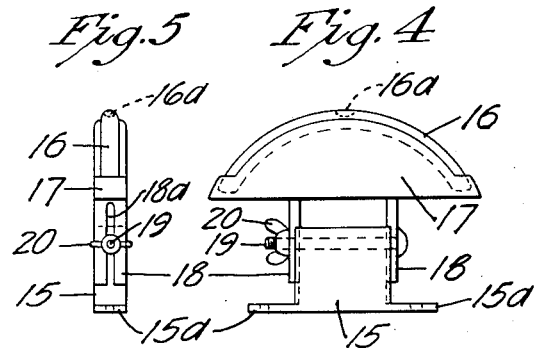
INVENTOR.
Bernard C. Maier
BY
Williamson & Williamson
ATTORNEYS Patented Apr. 10, 1951

2,548,226

UNITED STATES PATENT OFFICE 2,548,226

PLANTING SIGHT

Bernard C. Maier, Canby, Minn.

Application January 4, 1951, Serial No. 204,358

3 Claims. (Cl. 33—46)

This invention relates to a planting sight for farm tractors and the like.

Although the planting sight disclosed in my copending application, S. N. 754,399 filed June 13, 1947, Patent 2,538,112 granted Jan. 16, 1951, has operated quite satisfactorily it is relatively expensive to manufacture and depends on efficient bearing structures for its sensitivity.

It is an object of my present invention to provide an extremely simple, yet highly efficient planting sight attachment for farm tractors and the like, which is extremely inexpensive to manufacture and which does not depend in any way for its sensitivity on any mechanical interconnecting linkages or pivotal connections.

It is an object to provide a highly efficient, extremely simple planting sight for farm tractors, which has a pair of longitudinally aligned upwardly curved liquid containing transparent bubble tubes or glasses positioned to permit the tractor operator to sight along the air bubbles, whereby planting in equally spaced crop rows may be greatly facilitated.

More specifically, it is an object to provide a pair of bubble tubes or glasses adapted to be mounted in longitudinally spaced relation above the tractor engine with the bubbles thereof longitudinally aligned to permit a farmer operating the tractor to sight along the aligned bubbles and maintain the tractor in predetermined relation to the previously planted rows, regardless of the terrain over which the tractor is traveling, each of said bubbles having provisions for vertical adjustment to facilitate optimum positioning thereof.

These and other objects and advantages will more fully appear from the following description made in connection with the accompanying drawings wherein like reference characters refer to the same or similar parts throughout the several views and in which:

Fig. 1 is a side elevational view of my improved planting sight, as mounted on a farm tractor.

Fig. 2 is a front elevational view thereof.

Fig. 3 is a top plan view of one of the sighting elements.

Fig. 4 is a front elevational view thereof; and

Fig. 5 is a side elevational view thereof.

As illustrated in the accompanying drawings, there is shown a conventional tractor 10 having the front wheels 11 and the rear wheels 12 and provided with a gas tank and radiator shell 13 mounted above the tractor engine. A steering wheel 14 is provided, and a tractor operator is shown seated behind the wheel.

A front sighting element having a mounting bracket 15 adapted to be attached to the top of the gas tank and radiator shell 13, as best shown in Figs. 1 and 3, is provided with a pair of outstanding apertured attachment flange elements 15a. An arcuately curved liquid containing tube 16 is mounted in fixed relation on a suitable supporting and reinforcing member 17, which has a pair of depending arms 18 fixed thereto with the elongated upstanding slots 18a formed in said arms. This mounting and reinforcing member has an upwardly arcuately curved portion with a recess formed therein to receive and protect the lower portion of the bubble tube 16 and reinforces the same. An elongated clamping bolt 19 having a wing nut 20 threadably received on one end thereof extends through the elongated slots in the two arms 18 and through an aperture in the upstanding portion of the bracket 15 to permit said supporting and reinforcing member 17 to be securely clamped in vertically adjusted position on said mounting bracket 15. The liquid containing tube 16, of course, is provided with an air bubble 16a, best shown by the dotted lines in Figs. 3 and 4. Preferably, the liquid in the tube is colored, so that the air bubble 16a will be more easily visible.

A rear sighting element, generally similar to the front sighting element 16 and having a mounting bracket 21 is adapted to be mounted on the top of the rear portion of the fuel tank casing 13 of the tractor, and has a somewhat longer upstanding mounting portion than the mounting portion of bracket 15, shown in Figs. 4 and 5. An arcuately curved bubble glass 22, generally similar to the bubble glass 16 is securely fixed to a supporting and reinforcing member 23, generally similar to the member 17, and has an air bubble 22a illustrated in Fig. 2 by the dotted lines. A similar adjustment screw and wing nut are provided to clamp the supporting member in the desired adjusted position, and it will be seen from Figs. 1 and 2 that the rear bubble glass 22 is disposed at a somewhat higher elevation than the front bubble glass 16 to permit the tractor operator to sight downwardly on to the ground a relatively short distance in front of the tractor.

When planting along the contour lines of a hillside, the tractor 10 will be tilted, depending upon the slope of the hillside. The bubbles 16a and 22a will, however, remain in the highest portion of their respective transparent tubes in a manner similar to a carpenter's level, so that if the tractor operator also maintains his body substantially vertically disposed, he may sight along the longitudinally aligned bubbles 22a and 16a to a point moving along the ground, as the tractor progresses, in equally spaced relation to the rows of seeds already planted and substantially aligned with the row of seeds being planted. Equal spacing between the crop rows during the planting operation may be easily maintained with my improved sighting device, which is obviously more sensitive than the planting sight illustrated in my copending application, identified previously herein.

It will be seen that I have provided an extremely accurate and sensitive, easily adjustable planting sight for farm tractors, which will permit the tractor operator to easily maintain equal spacing between the rows of the crop being planted, even though the crop is being planted along the contour lines of a hillside field. The height of both the front and rear sighting elements may be easily adjusted to conform to the wishes of the tractor operator by merely raising and lowering the respective bubble tubes 16 and 22.

It will, of course, be understood that various changes may be made in the form, details, arrangement, and proportions of the parts without departing from the scope of my invention.

What I claim is:

1. A planting sight attachment for farm tractors and the like comprising at least a pair of upwardly curved hollow transparent closed tubular members, liquid completely filling each of said members except for a small air bubble therein, and means for mounting said transparent bubble members transversely of a tractor in longitudinally spaced relation thereon with the air bubbles disposed in longitudinally aligned relation relative to the tractor and positioned along the line of sight of the tractor operator to facilitate maintenance of equal spacing between the crop rows, even when planting along hill-side contour lines.

2. The structure set forth in claim 1, and reinforcing means surrounding the lower portion of each of said bubble members for supporting the same and minimizing breakage thereof.

3. A planting sight attachment for farm tractors and the like comprising a pair of upwardly curved hollow transparent closed tubular members, liquid completely filling each of said members except for a small air bubble therein, attachment means connected to each of said tubular members for mounting each of said bubble members transversely of the tractor and in longitudinally spaced relation on the tractor along the line of sight of the tractor operator with the air bubble thereof in longitudinally aligned relation to said line of sight, and mechanism permitting vertical adjustment of the relative elevation of the two bubble members one to the other, and to the line of sight of the tractor operator.

BERNARD C. MAIER.

No references cited.